Patented Dec. 25, 1923.

1,478,588

UNITED STATES PATENT OFFICE.

ERNEST M. SYMMES, OF WILMINGTON, DELAWARE, ASSIGNOR TO HERCULES POWDER COMPANY, OF WILMINGTON, DELAWARE, A CORPORATION OF DELAWARE.

EXPLOSIVE.

No Drawing.   Application filed June 26, 1922.   Serial No. 571,048.

*To all whom it may concern:*

Be it known that I, ERNEST M. SYMMES, a citizen of the United States, residing at Wilmington, county of New Castle, and State of Delaware, have invented a new and useful Improvement in Explosives, of which the following is a full, clear, and exact description.

My invention relates to those known explosives containing nitro sugar which are rendered stable by dissolving sugar in glycerine, subjecting the solution to the action of mixed nitric acid and sulfuric acid so as to nitrate both the glycerine and the sugar, allowing the nitrated compounds to settle out, removing the spent or waste acid from the nitrated compounds by washing with water and then treating the mixture of nitrated sugar and trinitroglycerine with a solution of sodium carbonate, or a known equivalent alkali, in water.

It is known that certain substances containing sugar do not give satisfactory results, and produce a gummy, sticky mass which cannot be properly washed with soda to stabilize it. The sugar that has heretofore given the most satisfactory results is cane sugar. However, the solution of sugar and glycerine is comparatively viscous, causing difficulties in the practical working of the process. In the unnitrated liquid, there is trouble in draining out the drums, tanks and pipe lines, in feeding into the nitrator regularly, and in distributing through the body of the acid in the nitrator. High viscosity of the nitrated liquid gives trouble in washing with water and alkali, in the slow settling from these washes, and in flowing down the gutters used for transportation from one house to another. Moreover, as an important object of dissolving any kind of sugar in glycerine is a reduction in the cost of the nitrated liquid, it is clear that it is ordinarily desirable to add as much sugar as possible. In the case of cane sugar, it is impracticable, due to the viscosity limitation, with the usual apparatus, to add more than about 20% sugar to 80% glycerine. Even with a special apparatus, 25% sugar seems to be the practicable maximum.

It is obvious, therefore, that if any form of sugar could be substituted for cane sugar that, added in equal proportion, would cheapen the product without increasing the viscosity or reducing the yield of nitrated compounds; or if an equally cheap, or even slightly more expensive, form of sugar were available that could be added in substantially larger proportion without producing a more viscous solution: in either case, the product would have distinct commercial advantages.

I have discovered that a known form of sugar possesses both of the advantages over cane sugar above specified; that is, it can be produced at a cost much less than the cost of cane sugar and a larger quantity of the same can be dissolved in a given amount of glycerine and give a solution that is less viscous than the solution of glycerine and cane sugar. The process of manufacture may be the same as in the manufacture of trinitroglycerine nitrated cane sugar, and no difficulties are encountered in the alkali washing or other treatments.

The sugar that I have discovered to possess the advantages specified is mannose, having the following composition:

The nature, sources and modes of extraction of mannose are known and are set forth in Handbook of Sugar Analysis by Browne.

d–mannose, represented above, is found in the free condition according to different investigators in the juices of various plants and in many germinating seeds. The sugar has also been found in certain molasses from tropical cane sugar factories; the mannose in molasses, however, is not derived from the cane, but is formed by the action of the lime used in clarification upon the glucose and fructose of the cane juice.

Mannose may be prepared either by hydrolysis of yeast gum, salep mucilage or any other of the isolated mannans, or by direct hydrolysis of some plant material rich in mannan. The latter method is the most direct and the easiest to carry out, there being several common vegetable substances, such as ivory nuts, carob beans, coffee berries, date seeds, etc., which yield large amounts of mannose on hydrolysis. Ivory nuts, or vegetable ivory (the fruit of *Phytelephas macrocarpa*), which is used so extensively for making buttons, is one of the best substances for preparing mannose. The method of Fischer and Hirschberger is as follows:

One part of ivory nut shavings (from button factories) is heated with 2 parts of 6% hydrochloric acid in a boiling water bath for six hours in a vessel connected with a reflux condenser. The hot solution is then separated from the insoluble residue, and the latter treated with a little water and pressed. The combined extract is then neutralized with sodium hydroxide, decolorized with bone black, filtered, evaporated to a thick syrup, and allowed to crystallize slowly, the crystallization being hastened if desired, by addition of a small amount of crystals of previous prepared mannose.

Mannose can also be prepared synthetically in a number of ways. d-mannite may be oxidized by dilute nitric acid to d-mannose, which can then be purified and crystallized. d-mannose can also be formed from d-glucose and d-fructose by molecular rearrangement by the action of dilute alkalies. The sugar has also been built up by Fischer from formaldehyde; the latter by condensation gives d-1-fructose, which upon reduction gives d-1-mannite, and this upon oxidation with bromine yields d-1-mannonic acid. The latter is resolved by crystallization of its strychnine salts into the dextro and laevo-rotary components.

d-mannose crystallizes as the anhydride $C_6H_{12}O_6$ in rhombic crystals melting at 132° C. The sugar has a pleasant sweet taste and is easily soluble in water and 80% alchohol, very slightly soluble in hot absolute alcohol and insoluble in ether.

The most economical of the above methods of producing mannose is to utilize the ivory nut shavings produced as waste in the manufacture of buttons. This material is available in large quantities at small cost.

When the mannose is prepared, the procedure may be the same as in the manufacture of the nitrated cane sugar—trinitroglycerine mixture. The mannose is dissolved in glycerine and the solution subjected to the action of the mixed acids. The liquid so obtained is allowed to settle out the nitrated compounds, which are then washed with water and then with a solution of sodium carbonate of suitable strength. The alkali solution is then drawn off and discarded.

Variations of this procedure are permissible. The mannose and glycerine may be introduced into the nitrator simultaneously before they have formed a solution, or they may be introduced into the mixed acids separately. The acids may be of various proportions and of various strengths and they may or may may not contain water. The proportions of mannose, glycerine and acids, the alkaline agents, the strengths of the alkali, and the temperatures, may be varied. It may also be stated that a larger or smaller proportion of mannose than will actually dissolve in the glycerine without producing a highly viscous solution may be added thereto, although the full advantage of my invention can not be availed of unless there is added about the maximum proportion of mannose capable of so dissolving in the glycerine without producing an objectionably viscous solution. It has been found that a solution of 35–40% mannose and 60—65% glycerine is far less viscous than a solution of cane sugar and glycerine of the same proportions, with consequent advantages in respect to working and to cheapening of the product; while the product may be still further cheapened, without producing a high degree of viscosity, by using a substantially larger proportion of mannose.

I may substitute for glycerine a glycol or a mixture of glycols, such as ethylene and propylene glycols; and in specifying glycerine in the claims I do not mean to exclude the glycols as equivalents.

It will also be understood that my invention would not be departed from if some ingredient not specified were incorporated in the composition, as, for example, if some cane sugar or other form of sugar were added, or if starch were suspended in the glycerine, so long as mannose were used in substantial proportions. The use of starch in suspension in the glycerine, while possessing distinct advantages, is, however, disclaimed as any part of the present invention.

The following is a typical method of procedure:

Four parts of mannose are dissolved in six parts of glycerine. Twenty parts of the solution is nitrated with about 100 parts of a standard mixture of acids: nitric, 45%, sulfuric, 55%. The mixture of trinitroglycerine, nitrated mannose and spent acid is then washed with water and then with a 2 per cent. solution of sodium carbonate, in water, at a temperature of about 80° F. The alkali solution is then drawn off and discarded. The nitrated compounds are then stable.

Having now fully described my invention, what I claim and desire to protect by Letters Patent is:

1. An explosive consisting of a stabilized mixture of trinitroglycerine and nitrated mannose.

2. An explosive containing from twenty to forty parts nitrated mannose and from sixty to eighty parts nitroglycerine.

3. An explosive containing substantially forty parts nitrated mannose and substantially sixty parts nitrated glycerine.

In testimony of which invention, I have hereunto set my hand, at Wilmington, Del., on this 22nd day of June, 1922.

ERNEST M. SYMMES.